United States Patent Office.

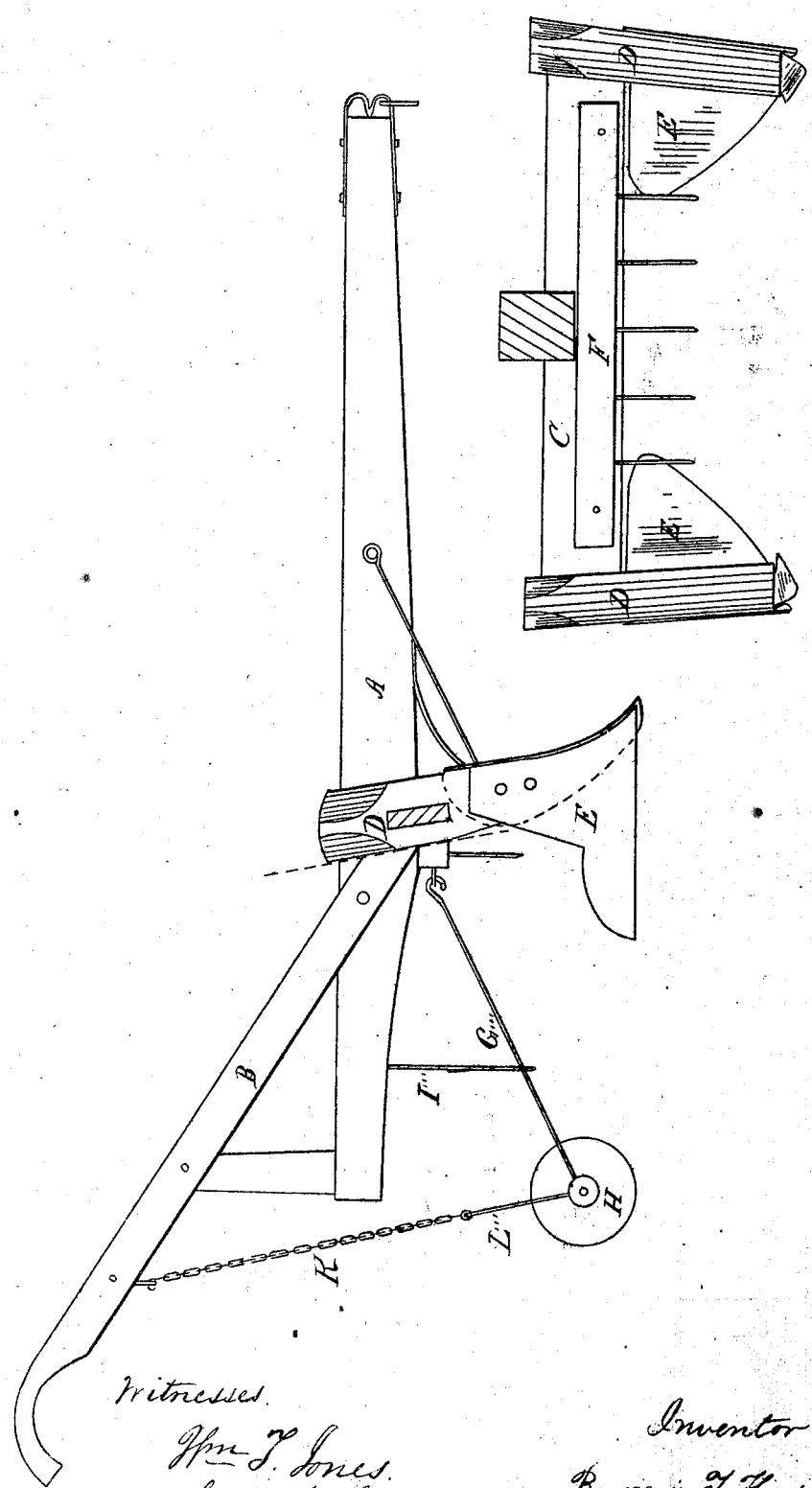

BENJAMIN T. HARDESTY, OF SUNDERLANDVILLE, MARYLAND.

Letters Patent No. 74,350, dated February 11, 1868.

IMPROVEMENT IN "TOBACCO-HILL PREPARER."

The Schedule referred to in these Letters Patent and making part of the same.

Be it known that I, BENJAMIN T. HARDESTY, of Sunderlandville, in the county of Calvert, and State of Maryland, have invented a new and useful Implement for the Purpose of Preparing Tobacco-Hills, known as "Tobacco-Hill Preparer;" and I do hereby declare that the following is a full, clear, and exact description of the construction and operation of the same, reference being had to the accompanying drawings.

The "preparer" is made with beams, A, and handles, B, similar to those of the "gang-plough." At each end of the cross-beam C is fastened, by tenon and mortise, a piece, D, of strong, hard wood. To these are fastened, on the inside, cast-iron mould-boards, E, with shares. On the outside are land-sides, thus forming one right and one left-hand plough. The rake is fastened to the cross-beam C, attached to which are two wrought-iron rods G running parallel with each other to the roller H, working up and down between the supporting or guiding-rods I. The chain K is attached to the rods between the handles, and the one, L, running parallel with the roller. This assists the ploughman in turning, as well as to raise and lower the roller. The guiding-rod I keeps the roller directly behind the ploughs, so that it may be used on hill-sides without sliding about.

With this implement from twenty to thirty thousand hills can be prepared in one day, thereby saving the labor of at least five men. The preparer is drawn by two horses. The land may be first ploughed and harrowed preparatory to laying off the first way. The rake and roller are detached, and one row is "laid off;" the plough returning, runs directly in the rear furrow of the first row. This is a guide for all the rest. Now, the rake and roller are attached and the land is laid off the second way by the same operation, the rake following the ploughs and levelling down and taking everything out that should not remain in the hills. The roller follows the rake and the hills are smoothly rolled, leaving them all one height and one width apart. This leaves the land in a much better condition for the young plant than if prepared with a hoe, as the water will run off rather than settle around and drown the young plant.

What I claim as my invention, and desire to secure by Letters Patent, is—

The combination of the plough, rake, and roller, and the manner in which the roller is attached.

BENJAMIN T. HARDESTY.

Witnesses:
SAMUEL SUNDERLAND,
JOHN T. STEVENS.